(12) United States Patent
Reid

(10) Patent No.: US 7,234,523 B2
(45) Date of Patent: *Jun. 26, 2007

(54) HYDRAULIC FRICTION FLUID HEATER AND METHOD OF USING SAME

(75) Inventor: B. J. Reid, Houston, TX (US)

(73) Assignee: Saipem America Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/295,253

(22) Filed: Dec. 5, 2005

(65) Prior Publication Data

US 2006/0081376 A1    Apr. 20, 2006

(51) Int. Cl.
*F28D 15/00* (2006.01)

(52) U.S. Cl. .................. 166/302; 166/304; 165/45; 165/104.21

(58) Field of Classification Search ............... 166/302, 166/304, 56, 71; 165/45, 104.21, 104.27
See application file for complete search history.

(56) References Cited

U.S. PATENT DOCUMENTS

| | | | | |
|---|---|---|---|---|
| 3,643,736 A | * | 2/1972 | Talley, Jr. .................... 166/356 |
| 3,908,763 A | * | 9/1975 | Chapman .................... 166/302 |
| 5,803,161 A | * | 9/1998 | Wahle et al. .......... 165/104.21 |
| 6,200,068 B1 | * | 3/2001 | Bath et al. ............... 405/184.1 |
| 6,415,868 B1 | * | 7/2002 | Janoff et al. ................. 166/368 |
| 6,564,011 B1 | * | 5/2003 | Janoff et al. ................. 392/480 |
| 6,813,893 B2 | * | 11/2004 | Bishop et al. ............... 62/53.1 |
| 7,036,596 B2 | * | 5/2006 | Reid .......................... 166/302 |
| 2003/0140946 A1 | * | 7/2003 | Coats .......................... 134/18 |
| 2004/0040716 A1 | * | 3/2004 | Bursaux ..................... 166/303 |

\* cited by examiner

*Primary Examiner*—William Neuder
(74) *Attorney, Agent, or Firm*—Howrey, LLP

(57) ABSTRACT

A method and apparatus for heating a portion of a subsea structure is provided. The method includes pumping a fluid through a length of tubing such that the temperature of the fluid increases. The temperature increase of the fluid is created by friction in the tubing, and may be also be created by at least one pressure reducing device such as an orifice, pressure reducing valve, or relief valve. A subsea structure may be heated by transferring heat from fluid circulating in a closed loop configuration or by direct application of fluid to the subsea structure using a nozzle. A remotely operated vehicle may be utilized to transport some or all of the equipment necessary, including pumps, tubing, heat exchangers, nozzles and tanks. The remotely operated vehicle provides power to the pumps used for circulating fluid through the tubing.

60 Claims, 8 Drawing Sheets

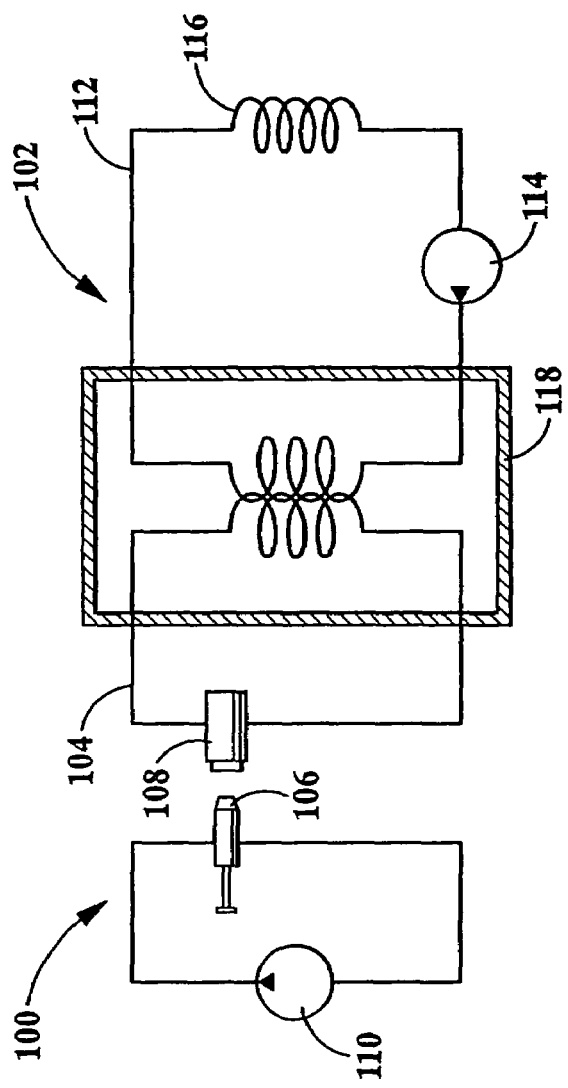
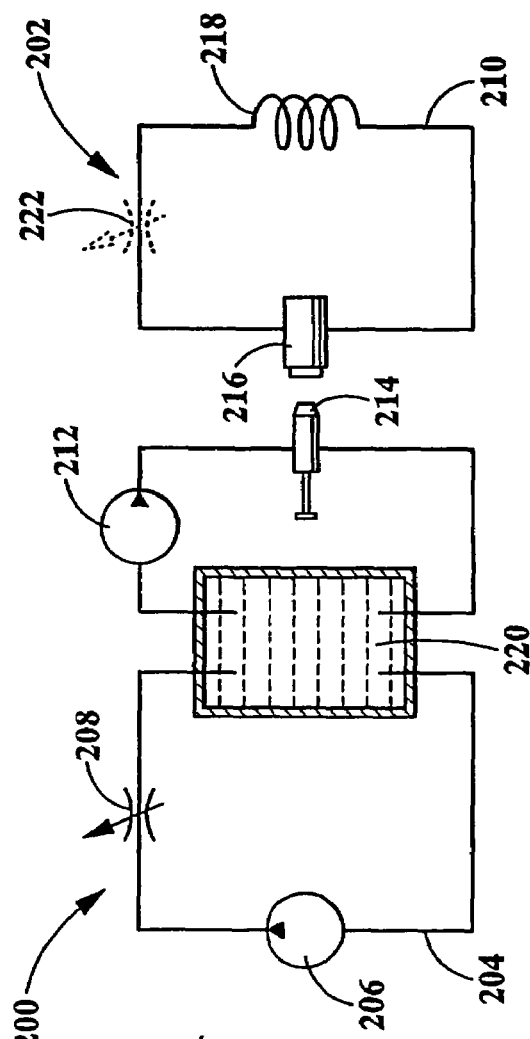
FIG. 2
FIG. 3A

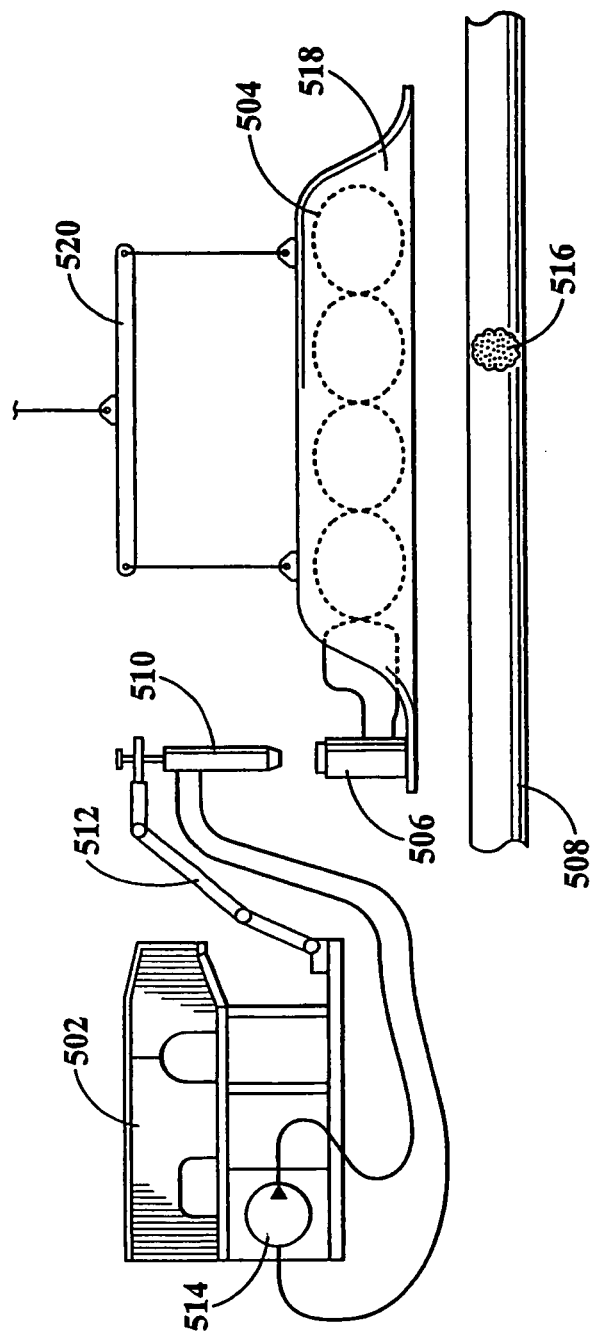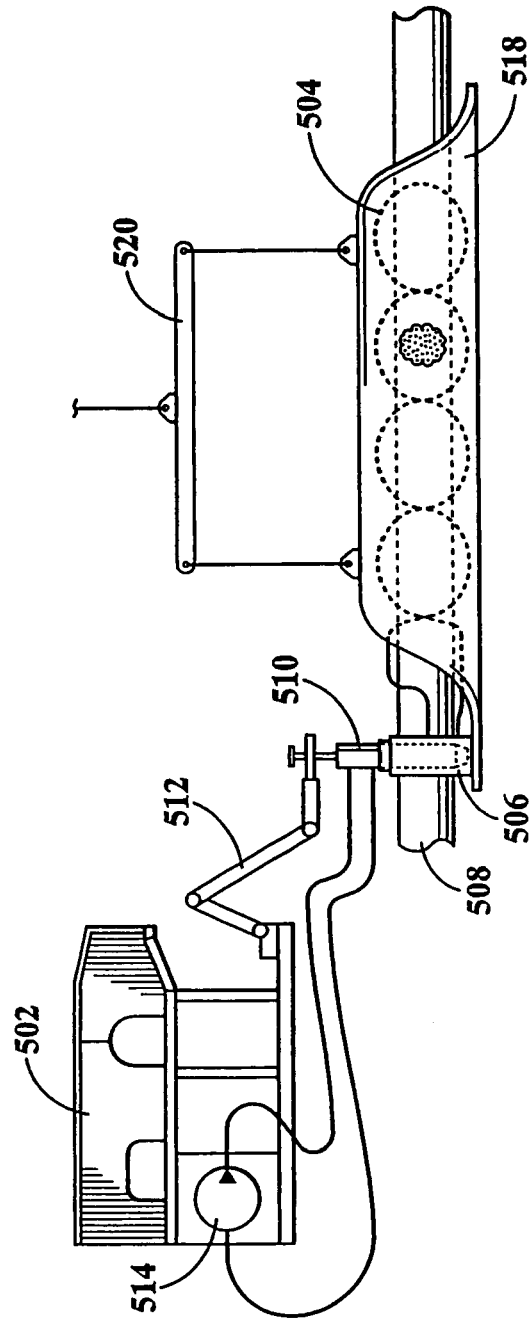

HYDRAULIC FRICTION FLUID HEATER AND METHOD OF USING SAME

PRIORITY CLAIM

This application claims priority to U.S. patent application Ser. No. 10/946,916, filed Sep. 22, 2004, which claims priority to U.S. Provisional Patent Application Ser. No. 60/505,284, filed Sep. 23, 2003, both of which are incorporated herein by reference.

BACKGROUND OF THE INVENTION

The present invention relates generally to an apparatus and method for providing heat to a subsea pipeline or other structure, and more particularly relates to a hydraulic friction fluid heater for providing heat to a subsea pipeline or other structure.

There often arises a need for heat to be supplied in a subsea environment. This frequently comes up in the offshore oil and gas industry. It is well known in the oil and gas industry that under certain pressure and temperature conditions the gases in a typical oil or gas well may form a solid hydrate or a solid wax within a pipeline. A hydrate is basically methane- or hydrocarbon-type ice. A wax is basically a paraffin-based solid formation. Hydrates and waxes are more likely to form under conditions of high pressures and low temperatures. Although hydrates and waxes may form at any water depth, hydrate and wax formation occurs more commonly in deep water. For example, at about 1000 feet and below, the water temperature remains relatively constant—just slightly above freezing in the vast majority of the world's oceans. The pressure, however, dramatically increases with depth, which affects hydrate and wax formation. In general, the deeper the water the more critical a problem hydrates and waxes become for oil company operators. Typically, hydrate and wax formation becomes an issue at approximately 500 meters (1500 feet), and below approximately 1000 meters (3000 feet) presents serious problems for oil companies.

The solid hydrate or wax forms a blockage inside a pipeline and reduces or completely blocks the product flow of oil and/or gas. Hydrate formations also occur at other locations, for example, externally on a subsea well head. Hydrates have also formed externally on the connector between a subsea wellhead and the lower marine riser package ("LMRP") resulting in frozen latches that prevent the connector from releasing.

Some companies have attempted to address the hydrate issue by installing hydrate traps in their pipelines. The hydrate trap is basically a loop inside the pipeline that is specific to hydrate remediation. The installed hydrate trap is intended to generate the heat to remediate the hydrate plugs or ice. However, hydrate formation is a problem for existing subsea pipelines having no hydrate traps as well as for subsea well heads and associated equipment mounted thereon.

Typically, when working in the subsea environment at significant depths, remotely operated vehicle ("ROV") systems are used. ROV systems are typically hydraulic-operated. In the past, attempts have been made at subsea hydrate and wax remediation with the use of electric heaters powered by an ROV system, however, typical ROV systems do not have sufficient electrical power to generate the heat necessary to effectively remediate such formations.

What is needed is a method and apparatus for performing subsea hydrate and wax remediation using heat. It is also desirable to have an apparatus and process for performing subsea hydrate and wax remediation using heat produced hydraulically. It is further desirable to have an apparatus and process for performing subsea hydrate and wax remediation using heat produced subsea. Additionally, it is desirable to have an apparatus and process to produce heat subsea using existing remotely operated vehicle ("ROV") systems.

SUMMARY OF THE INVENTION

A method and apparatus for heating a portion of a subsea structure is provided. The method includes pumping a fluid through a length of tubing such that the temperature of the fluid increases. The temperature increase of the fluid is created by friction in the tubing, and may be also be created by at least one pressure reducing device such as an orifice, pressure reducing valve, or relief valve. A subsea structure may be heated by transferring heat from fluid circulating in a closed loop configuration or by direct application of fluid to the subsea structure using a nozzle. A remotely operated vehicle may be utilized to transport some or all of the equipment necessary, including pumps, tubing, heat exchangers, nozzles and tanks. The remotely operated vehicle provides power to the pumps used for circulating fluid through the tubing.

A preferred embodiment of the present invention includes heating a portion of a subsea structure by pumping a fluid through a closed loop, thereby transferring heat from the fluid to the subsea structure. The fluid may be selected from seawater, water glycol, mineral oil, or any other suitable heat transfer fluid. At least one pressure reducing device, such as a fixed orifice, variable orifice, pressure reducing valve, or relief valve may be added to the closed loop to increase the temperature of the circulating fluid in the closed loop. Heat transfer to the subsea structure may be effected by winding the tubing around the subsea structure or by utilizing a heat exchanger of other form of heating coils configured proximate to the subsea structure. A pump located on a remotely operated vehicle is preferably used to circulate the fluid where the power is provided to the pump from the remotely operated vehicle.

Yet another embodiment of the present invention includes positioning heating coils around a subsea structure, connecting a pump to the heating coils such that the connected pump and heating coils form a closed loop, and pumping a fluid through the closed loop, thereby transferring heat from the fluid to the subsea structure through the heating coils. The heating coils may be positioned using a crane or by using a remotely operated vehicle. The pump is preferably located on the remotely operated vehicle, which also provides power to the pump. A receptacle and hot stab are preferably used to connect the pump to the heating coils. At least one pressure reducing device, such as a fixed orifice, variable orifice, pressure reducing valve, or relief valve may be added to the closed loop to increase the temperature of the circulating fluid in the closed loop.

Yet another embodiment of the present invention includes pumping a first fluid through a first closed loop, pumping a second fluid through a second closed loop, transferring heat from the first fluid to the second fluid, and transferring heat from the second fluid to the subsea structure. The first and second fluids may be the same type of fluid. At least one pressure reducing device, such as a fixed orifice, variable orifice, pressure reducing valve, or relief valve may be added to either the first or second loops to increase the temperature of the circulating fluid in each loop. The pump for either loop may be located on a remotely operated vehicle, which would also provide power to the pumps.

Yet another embodiment of the present invention includes pumping a fluid through a first loop using a first pump and pumping the same fluid through a second loop using a second pump, thereby transferring heat from the fluid to the subsea structure in the second loop, where the first loop and the second loop are both in fluid communication with a common tank. At least one pressure reducing device, such as a fixed orifice, variable orifice, pressure reducing valve, or relief valve may be added to either the first or second loops to increase the temperature of the fluid. A third loop (and even more loops) may also be utilized to circulate the fluid through the common tank to increase the temperature of the fluid. The pump for any of the loops may be located on a remotely operated vehicle, which would also provide power to the pumps. The common tank may also be located on or carried by a remotely operated vehicle.

Yet another embodiment of the present invention includes heating an exterior portion of a subsea structure by pumping a first fluid through a tubing, and directing the first fluid through a nozzle directly at the exterior of the subsea structure. The fluid is preferably environmentally friendly, such as seawater or water glycol. The nozzle is preferably positioned using a remotely operated vehicle. The pump may be located on a remotely operated vehicle, which would also provide power to the pump. A second fluid may also be pumped through a closed loop, where the heat generated in the closed loop is transferred from the second fluid to the first fluid in a heat exchanger. At least one pressure reducing device, such as a fixed orifice, variable orifice, pressure reducing valve, or relief valve may be added to the tubing or to the to closed loop to increase the temperature of the fluid exiting the nozzle.

BRIEF DESCRIPTION OF THE DRAWINGS

A more complete understanding of the present invention may be obtained with reference to the accompanying drawings:

FIG. 2 illustrates a dual closed loop hydraulic friction fluid heater in accordance with certain teachings of the present invention.

FIGS. 3A-B illustrate a dual loop hydraulic friction fluid heater utilizing a common fluid in accordance with certain teachings of the present invention.

FIGS. 7A-B illustrate the use of a remotely operated vehicle and a crane to complete a hydraulic friction fluid heater in accordance with certain teachings of the present invention.

DESCRIPTION OF ILLUSTRATIVE EMBODIMENTS

Figure 1A:
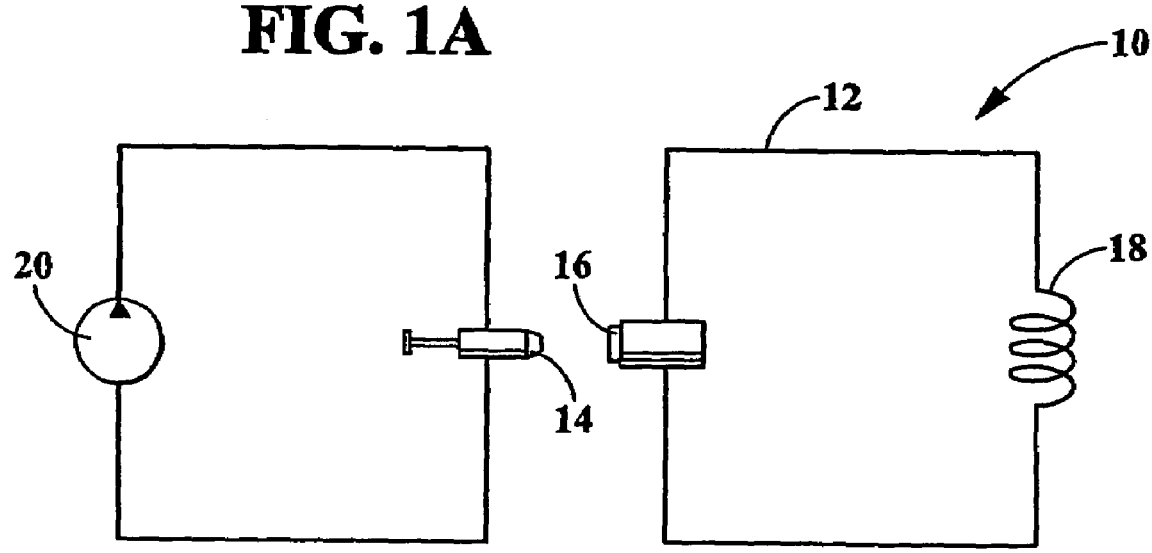
FIGS. 1A-D illustrate a single closed loop hydraulic friction fluid heater in accordance with certain teachings of the present invention.

The hydraulic friction fluid heater of the present invention is based on the fluid power equation 1:

$$\text{Power} = \text{Pressure} \times \text{Flowrate}, \quad (1)$$

where a change in pressure or flowrate will produce a change in power, and a power change is manifested as heat transfer as reflected in equations 2 and 3:

$$\text{Heat Transfer} = \text{Power Drop} = \text{Pressure Drop} \times \text{Flowrate}, \text{ or} \quad (2)$$

$$\text{Heat Transfer} = \text{Power Drop} = \text{Pressure} \times \text{Flowrate Increase}. \quad (3)$$

As described with respect to the illustrative embodiments described herein, a hydraulic friction fluid heater generates friction heat by circulating fluid through tubing and other pressure-reduction devices. There are three basic scenarios for utilizing the teachings of the present invention. The first scenario is a closed loop configuration in which heat is generated within a closed loop, the heat then being transferred to the desired structure to be heated. The second scenario includes a dual loop system with isolation between the fluids in each loop, where the heat generated in one loop is transferred to the fluid in the second loop, which in turn transfers heat to the desired structure to be heated. The third scenario includes an open loop or circuit, where the fluid is heated but not circulated, with the heated fluid then being sprayed or otherwise directly introduced to the desired structure to be heated.

In a hydraulic friction fluid heater, the pressure and/or flowrate can be adjusted to control the amount of heat provided to a subsea pipeline or structure. There are numerous ways to vary flowrate, including but not limited to using a variable displacement pump, or adjusting the speed of a fixed-displacement pump. Various devices may be used to produce additional pressure drop in the flow, including but not limited to fixed orifices, adjustable or variable orifices, relief valves, and pressure reducing valves (such as needle valves). Each of these can be remotely or manually adjustable, and set to produce a desired pressure drop in the hydraulic friction fluid heater.

Any fluid can be used in conjunction with the heating methods of the present invention. Preferably, seawater is used as the circulation fluid through the tubing because it is environmentally friendly, although water glycol moistures, mineral oil, or any other fluid may also be used. Environmental friendliness is a critical factor for embodiments of the present invention in which there is the potential for the fluid to enter the surrounding seawater, such as with an open circuit configuration or through the use of a relief valve. The hydraulic circuit also preferably includes a check valve that allows the hydraulic circuit to fill or take in some additional fluid, such as surrounding seawater or another fluid from a reservoir. The check valve allows the fluid to enter the circuit and remove any trapped air or gas in the tubing. The check valve also allows the intake of fluid needed in order to keep the hydraulic circuit filled. A pressure relief valve, on the other hand, allows excess pressure to exit the circuit during heat generation to prevent over pressurization of the circuit.

The fluid heater of the present invention will now be described in greater detail with specific reference to the drawings. Referring to FIG. 1A, a preferred embodiment of the present invention is illustrated with a single closed loop 10 that provides direct heating to a subsea structure. Loop 10 is primarily composed of a length of tubing 12, the length being dependent on various factors discussed below. When the hot stab 14 is connected to the receptacle 16, closed loop 10 is completed. Heat exchanger 18, which is described in more detail below, acts to transfer heat from loop 10 to the desired subsea structure. As discussed above, altering the pressure or flowrate output of pump 20 can increase or decrease the amount of heat transfer.

Preferably, the tubing 12 is small diameter on the order of 0.25" to 0.50" in diameter, although any diameter tubing, hoses, or piping may be used in accordance with the teachings of the present invention. Tubing 12 preferably has a 3000 psi rating, which is readily available. Tubing with a higher rating can be used, but this typically requires a heavier wall thickness. It is preferable to use tubing 12 have a relatively thin wall thickness for maximum efficiency for thermal heat exchange. Tubing 12 is preferably has a plurality of bends or directional changes, especially those associated with heat exchanger 18. The more bends and the longer the length of tubing 12, the greater the frictional heat that is generated. The directional changes are not critical to the present invention but may be desirable in certain embodiments of the present invention. Tubing 12 may also be insulated in order to prevent the loss of heat to the ambient.

For purposes of illustration, following are some examples of the fluid heater of the present invention as shown in FIG. 1A. In these examples, the tubing 12 was wrapped around a 6' long, 6.625" outside diameter (O.D.) mandrel, oil was the circulation fluid, and a 3000 pound per square inch (psi) pressure drop occurred across the mandrel. In the following table, the flowrate and power requirements are tabulated for several tubing sizes and lengths.

TABLE 1

| Tubing size, inches | Length of tube wrapped, ft | Req'd Flowrate, gpm | Req'd Power,* hp | Req'd Power, kW |
| --- | --- | --- | --- | --- |
| 0.250 | 469 | 3.6 | 7.4 | 5.5 |
| 0.3125 | 394 | 6.9 | 14.2 | 10.6 |
| 0.375 | 327 | 10.5 | 21.6 | 16.1 |
| 0.500 | 138 | 25.0 | 51.5 | 38.4 |

*Assumes 85% pump efficiency

From the above table, to get a 3000 psi pressure drop over 138' of 0.50" tubing requires a flowrate of 25 gpm which requires about 38.4 kW, or about 51.5 hp. It is acceptable if more than 138' of tubing is used. However, if a shorter length of tubing is used, then an additional pressure drop device will be required in the circuit in order to get the most amount of heat into the pipe. The additional pressure drop device could include, for example, a needle valve, an adjustable needle valve, a pressure relief valve, or a fixed orifice. The required power on the table represents the power provided by a power source, such as a remotely operated vehicle (ROV) as described below with respect to FIGS. 6-9B. The amount of power "in" equals the amount of power "out" less inefficiencies. Therefore, by putting about 38 kW of power into the fluid in the tubing with about 51 hp of input energy into the circuit of 138' of 0.5" tubing results in a pressure drop of 3000 psi.

Figure 1B:
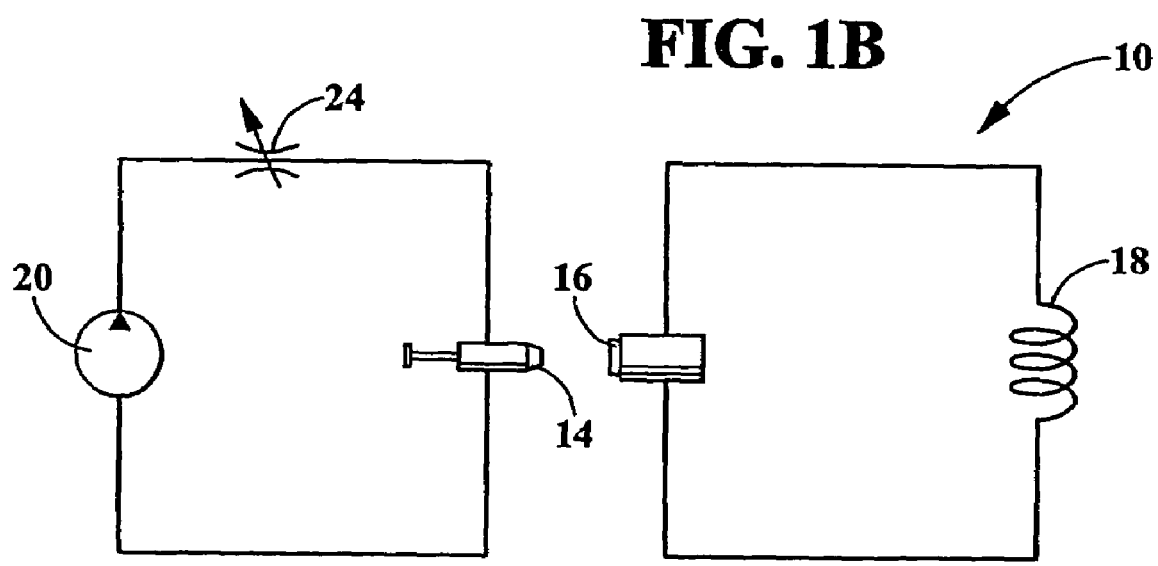

FIG. 1B illustrates another illustrative embodiment of the present invention. In FIG. 2B, an orifice 24 is added to the closed loop from FIG. 1A, which creates a further pressure drop with loop 10. Orifice 24 can be adjusted to further increase or decrease pressure drop in the circuit. The energy from the pressure drop across orifice 24 is converted to heat in the circulating fluid, thus raising the temperature of the circulating fluid, and increasing the heat transfer across heat exchanger 18. This temperature increase is in addition to any adjustments made to the flow from pump 20.

Figure 1C:
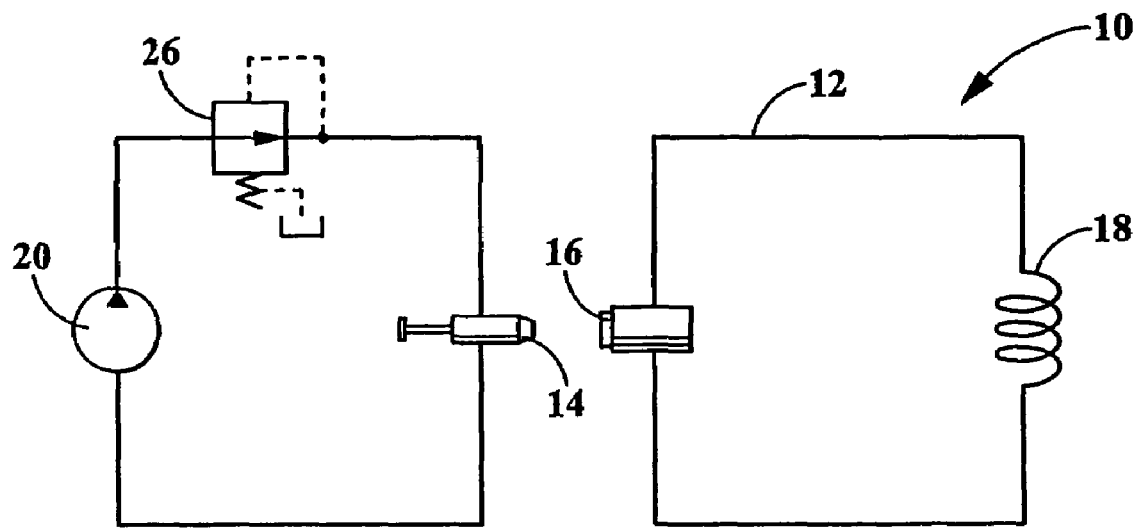

FIG. 1C illustrates another illustrative embodiment of the present invention. In FIG. 1C, a pressure reducing valve 26 is added to the loop from FIG. 1A, which creates a further pressure drop within loop 10. The circulating fluid after the valve has reduced pressure and the excess energy from the pressure drop is converted to heat in the circulating fluid, thus raising the temperature of the circulating fluid, and increasing the heat transfer across heat exchanger 18. This temperature increase is in addition to any adjustments made to the flow from pump 20. The pressure reducing valve can also be adjusted to fine tune the pressure drop and the overall fluid temperature.

For purposes of illustration, following are some examples of a fluid heater of the present invention generating friction heat by circulating water through a small diameter tubing in combination with a needle valve as shown in FIG. 1C. This table assumes water pumped through 200' of 0.50" diameter tubing or hose. The following table shows the various pressure drops and associated flow rates and power requirements.

TABLE 2

| Pressure Drop, psi | Req'd Flowrate, gpm | Req'd Power, hp* input to pump | Req'd Power, kW |
| --- | --- | --- | --- |
| 100 | 4.8 | 0.3 | 0.2 |
| 500 | 10.8 | 3.7 | 2.8 |
| 1000 | 15.3 | 10.5 | 7.8 |
| 1500 | 18.8 | 19.3 | 14.4 |
| 1700 | 20.0 | 23.3 | 17.4 |
| 2000 | 21.7 | 29.8 | 22.2 |
| 2500 | 24.3 | 41.6 | 31.0 |
| 3000 | 26.6 | 54.7 | 40.8 |

*Assumes 85% pump efficiency

From the above table, a pressure drop of 3000 psi corresponds with a flowrate of 26.6 gpm of water through 200' of 0.50" tubing requiring approximately 55 hp input to the pump and 40 kW of power from a power source, such as an ROV as described below with respect to FIGS. 6-9B. It is to be understood that this is just a representative set of data and curve and that can be run for any diameter and any length of tubing. For example, if the pressure drops 100 psi through 200' of tube at 0.3 hp, not much heat is being generating.

Figure 1D:
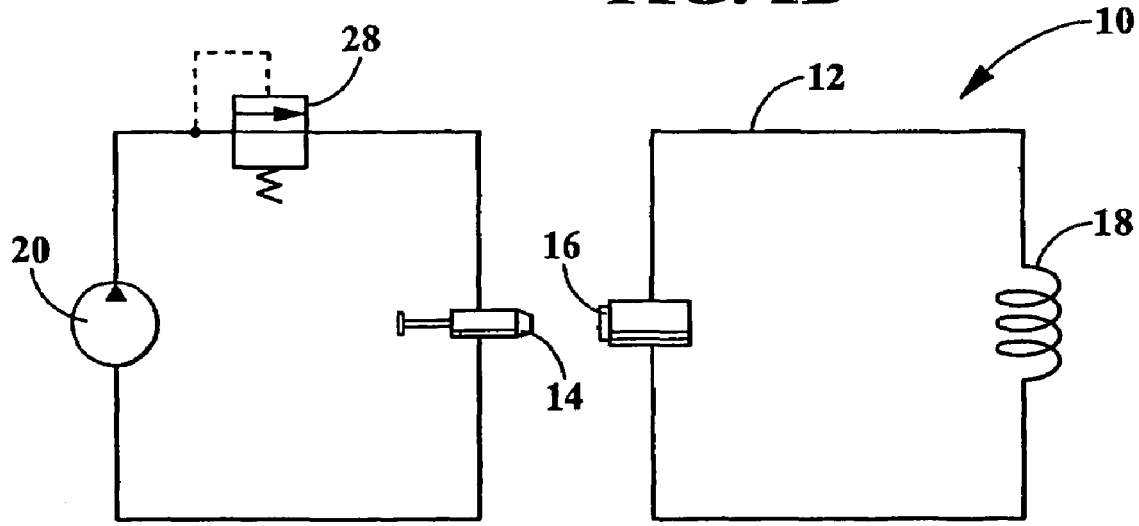

FIG. 1D illustrates another illustrative embodiment of the present invention. In FIG. 1D, a relief valve 28 is added to the loop from FIG. 1A, which creates a further pressure drop within loop 10. In the preferred embodiment, the pressure relief valve 28 vents directly out to the surrounding seawater. The excess energy from the pressure drop is converted to heat in the circulating fluid, thus raising the temperature of the circulating fluid, and increasing the heat transfer across heat exchanger 18. This temperature increase is in addition to any adjustments made to the flow from pump 20. For relief valves that are adjustable, the pressure drop can be controlled using the valve setting.

Although not shown in FIGS. 1A-D, one of skill in the art should appreciate that any combination or multiples of pressure reduction devices (orifice 24, pressure reducing valve 26, relief valve 28) can be utilized within loop 10 to effectuate the desired heat transfer.

Referring to FIG. 2, another preferred embodiment of the present invention is illustrated with dual closed loops 100 and 102 that provides indirect heating to a subsea structure. With two closed loops, different fluids can be pumped in each loop. Loop 100 is primarily composed of a length of tubing 104, a hot stab 106 and receptacle 108, and a pump 110. Loop 102 is primarily composed of a length of tubing 112, pump 114, and heat exchanger 116 (described in more detail below), which acts to transfer heat from loop 102 to the desired subsea structure.

An intermediate heat exchanger 118 is used in order to transfer heat generated in the circulating fluid of loop 100 to the circulating fluid of loop 102. With this dual loop configuration, the heat transfer to the subsea structure will depend on the power input to each loop. This is effectively a series aiding circuit where the circulating fluid of loop 102 is preheated by the circulating fluid of loop 100, and is then further heated by pump 114 as described above. As discussed above, altering the pressure or flowrate output of pumps 110 and 114 can increase or decrease the amount of heat transfer to the subsea structure. The flow characteristics can be adjusted independently for each loop. Different circulating fluids can also be used for each loop in order to optimize heat transfer. For example, loop 100 can circulate hydraulic oil and loop 102 may circulate seawater. Although not shown in FIG. 2, any combination or multiples of pressure reduction devices (e.g. orifice, pressure reducing valve, relief valve) can be utilized within each loop to effectuate the desired flow characteristics and heat generation.

Referring to FIG. 3A, another preferred embodiment of the present invention is illustrated with dual loops 200 and 202 that provide direct heating to a subsea structure. Loop 200 is primarily composed of a length of tubing 204 and a pump 206. As shown in FIG. 3A, orifice 208 is added to loop 200 in order to provide increased pressure drop and increased fluid temperature. Loop 202 is primarily composed of a length of tubing 210, pump 212, a hot stab 214 and receptacle 216, and heat exchanger 218 (described in more detail below), which acts to transfer heat from loop 202 to the desired subsea structure.

In this embodiment, a tank preheater 220 is used instead of an intermediate heat exchanger to transfer the heat generated in 200 to loop 202. One fluid is circulated in loops 200 and 202, and is mixed in tank preheater 220. As discussed above, altering the pressure or flowrate output of pumps 206 and 212 can increase or decrease the temperature of the circulating fluid and affect amount of heat transfer to the subsea structure. The flow characteristics can be adjusted independently for each loop. Any combination or multiples of pressure reduction devices (e.g. orifice, pressure reducing valve, relief valve) can be utilized within each loop to effectuate the desired flow characteristics and heat generation. For example, FIG. 3A illustrates the addition of orifice 222 to loop 202 to increase the heat generated in loop 202.

Figure 3B:
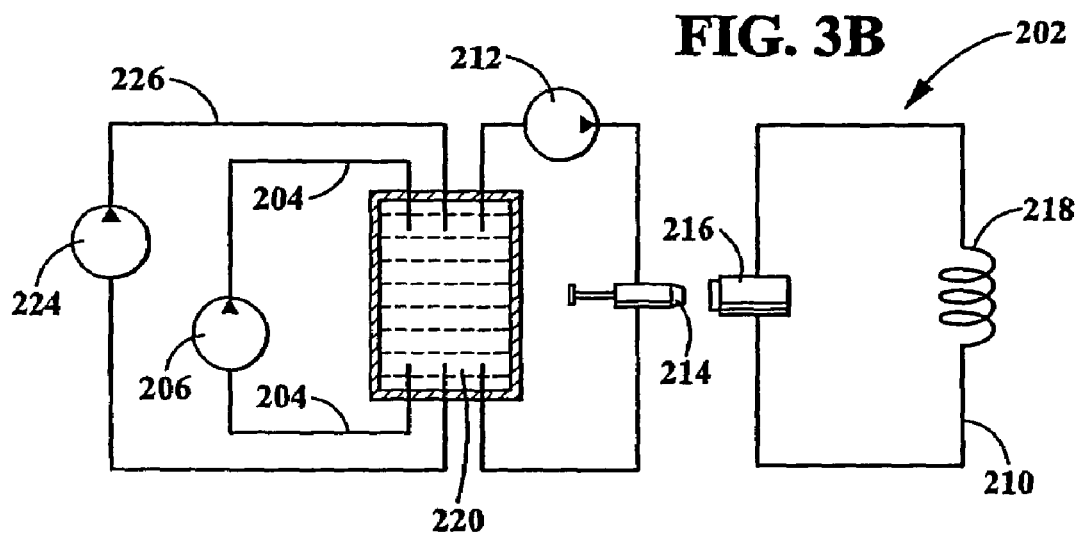

FIG. 3B illustrates yet another embodiment of the present invention in which parallel pumps are used in loop 200 for additional heat generation, which increases the potential final temperature of the circulating fluid and heat transfer to the subsea structure. As compared to FIG. 3A, FIG. 3B's loop 200 adds a second pump 224 and a second length of tubing 226 to circulate fluid through tank preheater 220. As before, any combination or multiples of pressure reduction devices (e.g. orifice, pressure reducing valve, relief valve) can be utilized within each loop to effectuate the desired flow characteristics and heat generation.

Figure 6:
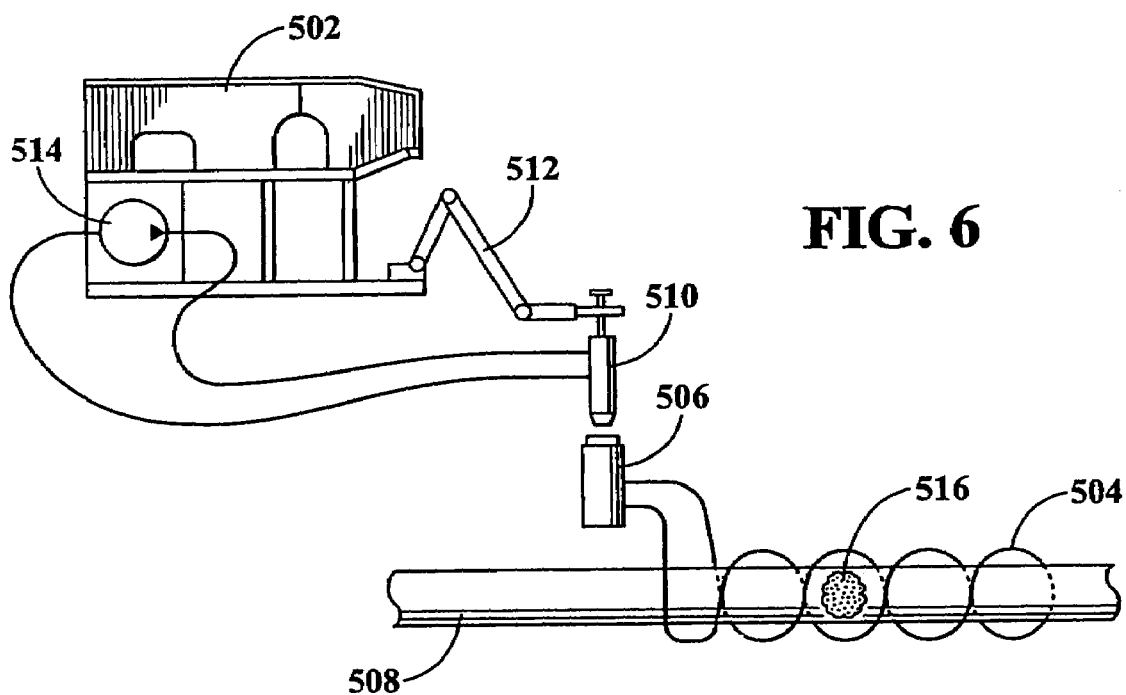
FIG. 6 illustrates the use of a remotely operated vehicle to complete a hydraulic friction fluid heater in accordance with certain teachings of the present invention.

Referring to FIG. 6, a preferred embodiment of the present invention is illustrated where a remotely operated vehicle (ROV) 502 is used to transport one or more parts of a hydraulic fluid friction heating loop to the subsea structure to connect with the remaining parts of the loop that are pre-installed at the subsea structure. In the preferred method of the present invention, the ROV 502, such as, for example, the INNOVATOR® manufactured by Sonsub Inc. of Houston, Tex., is deployed from a surface vessel (not shown) to connect one or more parts of a hydraulic friction fluid heater circuit to the remaining parts. As illustrated by example in FIG. 6, a heating coil 504 and receptacle 506 are pre-installed around a subsea structure, such as existing pipeline 508. ROV 502 would then insert the hot stab 510 into receptacle 506 by using its manipulator assembly 512, thereby completing the hydraulic friction fluid heater circuit. Heating coil 504 can be a separate heat exchange device or may be a length of tubing configured with bends in such a way as to increase the frictional heat generated in the circulating fluid as well as to effectuate heat transfer between the circulating fluid and the subsea structure. Pump 514, which is carried by ROV 502, is operated until the circulating fluid reaches a predetermined temperature or until heat transfer has sufficiently melted the hydrate or hot wax plug 516. Pump operation is then stopped and ROV 502 then removes the hot stab 510 and returns to the surface or to its next job.

The embodiment illustrated by FIG. 6 most closely executes the schematic shown in FIG. 1A, where pump 20, hot stab 14, receptacle 16, and heat exchanger 18 of FIG. 1A corresponds to pump 514, hot stab 510, receptacle 506, and heating coil 504 of FIG. 6. One of ordinary skill in the art should appreciate that the schematics shown in FIGS. 1B-D, 2, and 3A-B may also be executed in like fashion. For example, in FIGS. 1B-D, orifice 24, pressure reducing valve 26, and/or relief valve 28 would be carried by ROV 502 to the subsea structure. For FIG. 2, pump 110 and hot stab 106 would be located on ROV 502, with the remaining equipment pre-installed at the subsea structure. For FIGS. 3A and 3B, heat exchanger 218 and receptacle 216 would be pre-installed at the subsea structure with the remaining equipment being carried down with the ROV or otherwise lowered into position on a separate skid by a crane.

Referring to FIGS. 7A and 7B, a preferred embodiment of the present invention is illustrated where ROV 502 is used to transport one or more parts of a hydraulic fluid friction heating loop to a subsea structure where the remaining parts of the loop are not pre-installed at the subsea structure. As illustrated by example in FIG. 7A, an insulating blanket 518 (containing heating coil 504) and receptacle 506 are lowered by crane 520, or alternatively by ROV 502 itself (not shown), to the area of the subsea structure to be heated, such as existing pipeline 508. It is to be understood that the size and physical shape of the insulating blanket 518 and heating coil 504 can be designed to accommodate the specific subsea structure. One of ordinary skill in the art should recognize that alternatives to insulating blanket 518 may be utilized in accordance with the teachings of the present invention, including preformed shells containing syntactic foam insulation, or a preformed shell surrounding the structure with insulation injected therein as is described in commonly owned U.S. patent application Ser. No. 10/922,418 entitled "Subsea Insulation Injecting System" filed Aug. 20, 2004, which is incorporated herein by reference. FIG. 7B shows the insulating blanket 518 and heating coil 504 installed around pipeline 508. ROV 502 would then insert the hot stab 510 into receptacle 506 by using its manipulator assembly 512, thereby completing the hydraulic friction fluid heater circuit. Pump 514, which is carried by ROV 502, is operated until the circulating fluid reaches a predetermined temperature or until heat transfer has sufficiently melted the hydrate or hot wax plug 516. Pump operation is then stopped and ROV 502 then removes the hot stab 510 and returns to the surface or to its next job. Insulating blanket 518, heating coil 504, and receptacle 506 would then be lifted to the surface by crane 520 (or alternatively by ROV 502 itself).

Similar to FIG. 6, the embodiment illustrated by FIGS. 7A-B most closely executes the schematic shown in FIG. 1A, where pump 20, hot stab 14, receptacle 16, and heat exchanger 18 of FIG. 1A corresponds to pump 514, hot stab 510, receptacle 506, and heating coil 504 of FIG. 6. One of ordinary skill in the art should appreciate that the schematics shown in FIGS. 1B-D, 2, and 3A-B may also be executed in like fashion. For example, in FIGS. 1B-D, orifice 24, pressure reducing valve 26, and/or relief valve 28 would be carried by ROV 502 to the subsea structure. For FIG. 2, pump 110 and hot stab 106 would be located on ROV 502, with the remaining equipment lowered to the subsea structure by crane or by the ROV itself. For FIGS. 3A and 3B, heat exchanger 218 and receptacle 216 would be lowered to the subsea structure by crane or ROV, with the remaining equipment being carried down with the ROV or otherwise lowered into position on a separate skid by a crane.

Figure 8A:
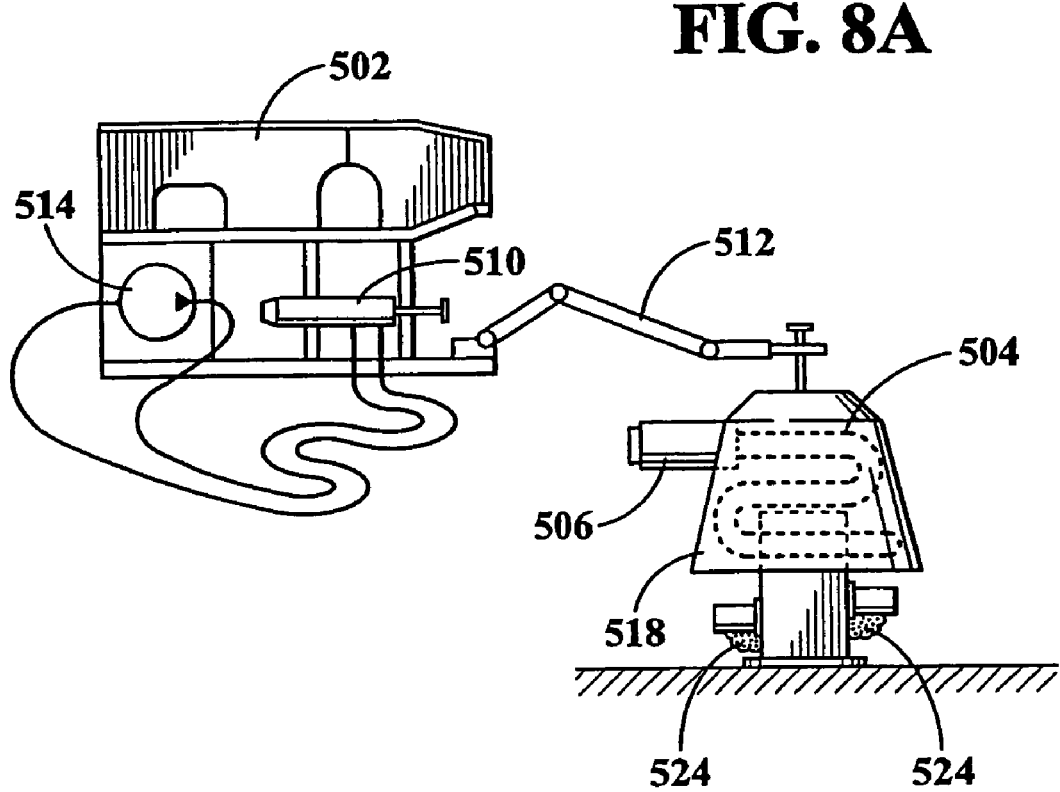
FIGS. 8A-B illustrate the use of a remotely operated vehicle to complete a hydraulic friction fluid heater in accordance with certain teachings of the present invention.
Figure 8B:
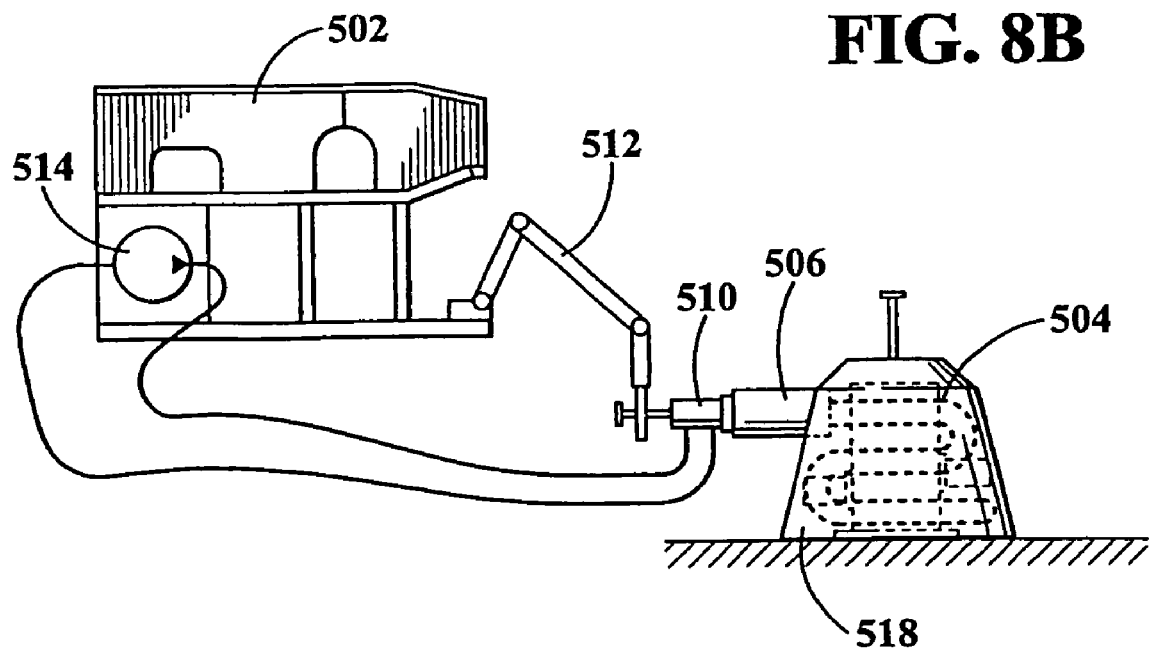

Referring to FIGS. 8A and 8B, a preferred embodiment of the present invention is illustrated where ROV 502 is used to transport one or more parts of a hydraulic fluid friction heating loop to a subsea structure where the remaining parts of the loop are not pre-installed at the subsea structure. As illustrated by example in FIG. 8A, an insulating blanket 518 (containing heating coil 504) and receptacle 506 are lowered by ROV 502 (and specifically its manipulator assembly 512), to the area of the subsea structure to be heated, such as external hydrate formation 524. FIG. 8B shows the insulating blanket 518 and heating coil 504 installed around the external hydrate formation 524. ROV 502 would then insert the hot stab 510 into receptacle 506 by using its manipulator assembly 512, thereby completing the hydraulic friction fluid heater circuit. Pump 514, which is carried by ROV 502, is operated until the circulating fluid reaches a predetermined temperature or until heat transfer has sufficiently melted hydrate 524. Pump operation is then stopped and ROV 502 then removes the hot stab 510 and returns to the surface or to its next job. Insulating blanket 518, heating coil 504, and receptacle 506 would then be lifted to the surface by ROV 502.

Similar to FIGS. 7A-B, the embodiment illustrated by FIGS. 8A-B most closely executes the schematic shown in FIG. 1A, where pump 20, hot stab 14, receptacle 16, and heat exchanger 18 of FIG. 1A corresponds to pump 514, hot stab 510, receptacle 506, and heating coil 504 of FIG. 6. One of ordinary skill in the art should appreciate that the schematics shown in FIGS. 1B-D, 2, and 3A-B may also be executed in like fashion, as is discussed with respect to FIGS. 7A-B.

Figure 9A:
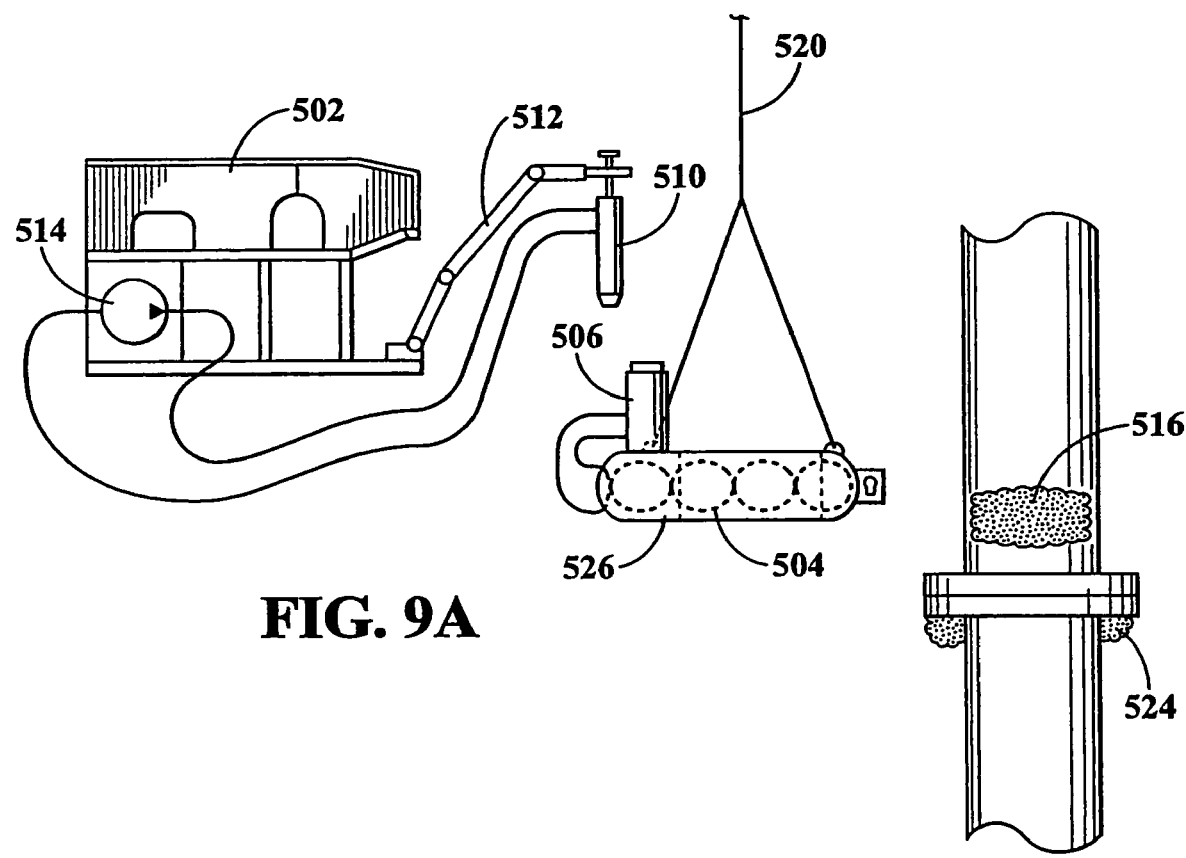
FIGS. 9A-B illustrate the use of a remotely operated vehicle and a crane to complete a hydraulic friction fluid heater in accordance with certain teachings of the present invention.
Figure 9B:
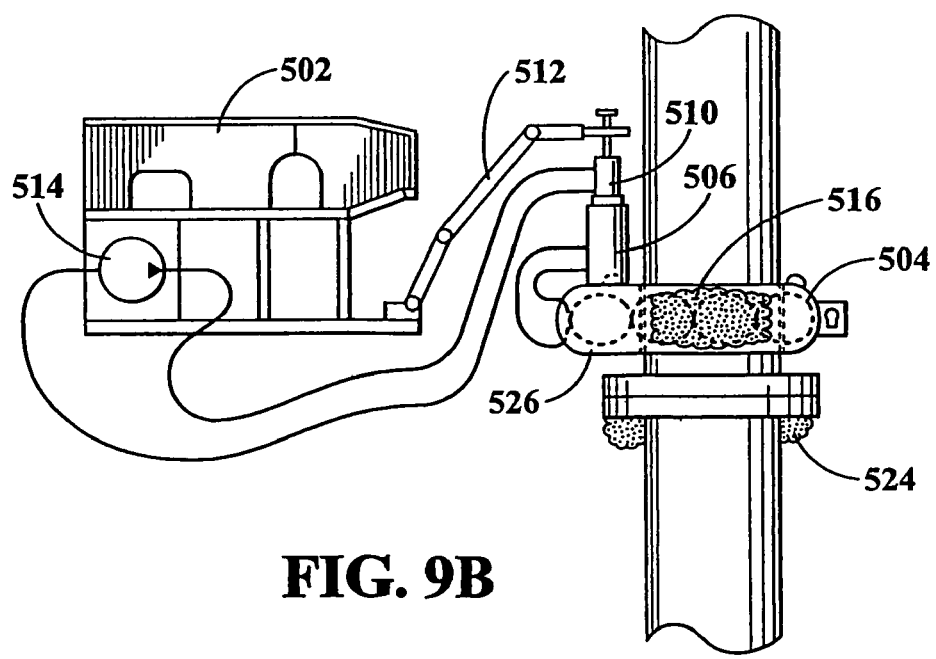

Referring to FIGS. 9A and 9B, a preferred embodiment of the present invention is illustrated where ROV 502 is used to transport one or more parts of a hydraulic fluid friction heating loop to a subsea structure where the remaining parts of the loop are not pre-installed at the subsea structure. As illustrated by example in FIG. 8A, an clamp-on insulation 526 (containing heating coil 504 ) and receptacle 506 are lowered by crane 520, or alternatively by ROV 502 itself (not shown), to the area of the subsea structure to be heated, such as internal wax plug 516 or external hydrate formation 524. FIG. 9B shows the clamp-on insulation 526 and heating coil 504 installed around the subsea structure proximate to the internal wax plug 516. ROV 502 would then insert the hot stab 510 into receptacle 506 by using its manipulator assembly 512, thereby completing the hydraulic friction fluid heater circuit. Pump 514, which is carried by ROV 502, is operated until the circulating fluid reaches a predetermined temperature or until heat transfer has sufficiently melted hydrate 516. Pump operation is then stopped and ROV 502 then removes the hot stab 510 and returns to the surface or to its next job. clamp-on insulation 526, heating coil 504, and receptacle 506 would then be lifted to the surface by crane 520 (or alternatively by ROV 502 itself).

Similar to FIGS. 7A-B, the embodiment illustrated by FIGS. 9A-B most closely executes the schematic shown in FIG. 1A, where pump 20, hot stab 14, receptacle 16, and heat exchanger 18 of FIG. 1A corresponds to pump 514, hot stab 510, receptacle 506, and heating coil 504 of FIG. 6. One of ordinary skill in the art should appreciate that the schematics shown in FIGS. 1B-D, 2, and 3A-B may also be executed in like fashion, as is discussed with respect to FIGS. 7A-B.

Figure 4A:
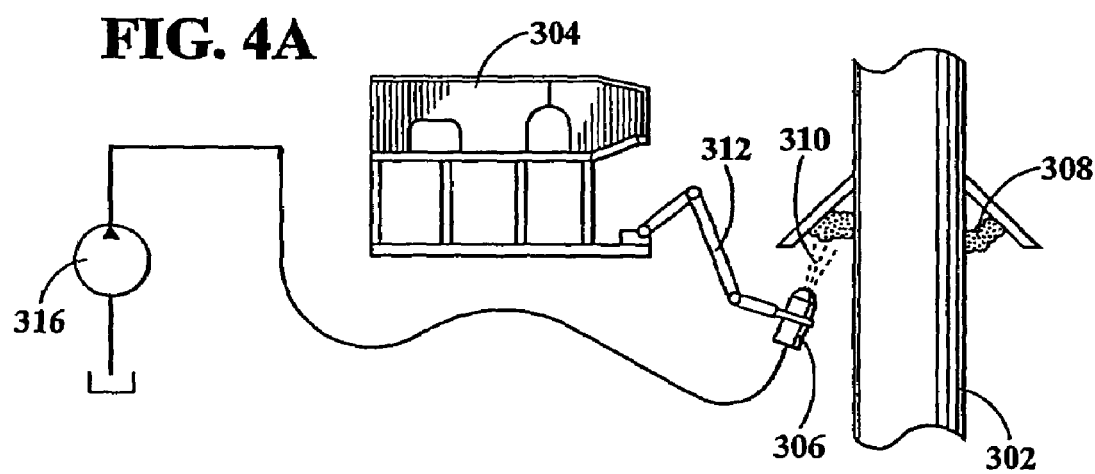
FIGS. 4A-B illustrate an open loop hydraulic friction fluid heater using a nozzle in accordance with certain teachings of the present invention.
Figure 4B:
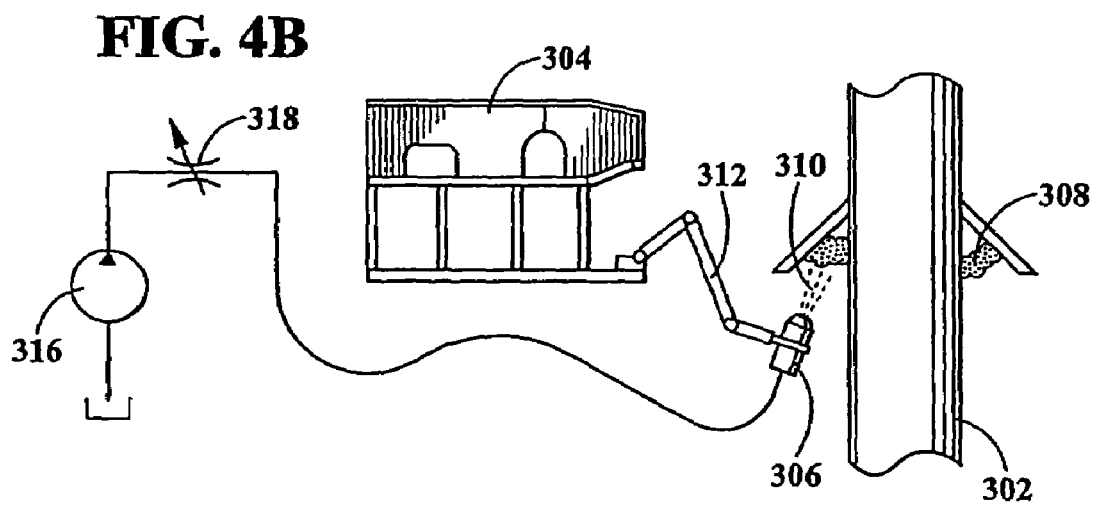

Referring to FIG. 4A, an alternate embodiment of the present invention is illustrated where a subsea structure 302 is directly heated using an hydraulic friction fluid heater with an open circuit configuration. ROV 304 is used to position nozzle 306 such that heated fluid 310 is sprayed directly onto hydrate formations 308 that are external to the subsea structure 302. The nozzle 306 is controlled and positioned using its manipulator assembly 312. The nozzle 306 receives the heated fluid through hose 314 and ultimately from pump 316, which intakes surrounding seawater. Pump 316 may be mounted on ROV 304, but may also be mounted on a separate skid that can be carried by the ROV, lowered into position by crane, or permanently located proximate to the subsea structure. The temperature of the fluid 310 exiting nozzle 306 depends on the flowrate from the pump. As with the closed loop embodiments described above, the most basic method for controlling the final temperature is by adjusting the flow or pressure drop in the circuit. Additionally, as shown in FIG. 4B, an orifice 318 allows the flow to be further optimized for the size of hose 314 or the characteristics of nozzle 306. A needle valve or pressure reducing calve could also be used, or the nozzle itself could be used as a flow and pressure control device.

Referring to FIG. 4A, an alternate embodiment of the present invention is illustrated where a subsea structure 302 is directly heated using an hydraulic friction fluid heater with an open circuit configuration.

Figure 5:
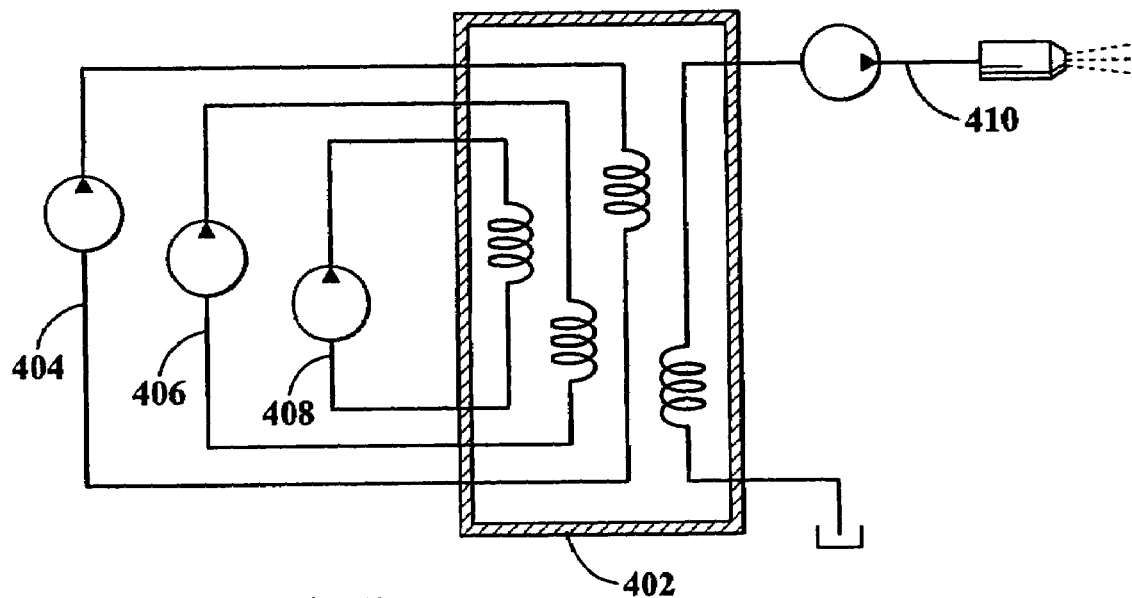
FIG. 5 illustrates an open loop hydraulic friction fluid heater in combination with a closed loop hydraulic friction fluid heater in accordance with certain teachings of the present invention.

One of ordinary skill in the art will appreciate that the elements of the preferred and illustrative embodiments set forth herein may be modified or combined in order to optimize the results of a particular application. For example, FIG. 5 illustrates the combination of multiple closed and open circuits to directly heat a subsea structure. Intermediate heat exchanger 402 is utilized to transfer heat between closed loops 404, 406, and 408, and open circuit 410. In essence, this embodiment is a combination of the embodiments described in FIGS. 2 and 4A-B. Multiple parallel closed loops allow more reasonable pressure drops in each circuit, while allowing a greater temperature differential within intermediate heat exchanger 402. As with the embodiments discussed previously, manually or remotely adjustable orifices, relief, or pressure reducing valves may be employed to further alter fluid flow characteristics and temperatures in any or all loops. Separate closed and open circuits allows for the use of different fluids to be used in each circuit. Accordingly, the flow in the open circuit 410 can be tailored for a lower/higher flowrate or pressure than the closed loops 404, 406, and 408.

It will be apparent to one of skill in the art that described herein is a novel method and apparatus for heating a subsea structure using a hydraulic friction fluid heater. While the invention has been described with references to specific preferred and exemplary embodiments, it is not limited to these embodiments. Although the invention herein is described in reference to subsea locations, it should be understood that the method and apparatus of this invention are likewise acceptable to other geographically remote locations. The invention may be modified or varied in many ways and such modifications and variations as would be obvious to one of skill in the art are within the scope and spirit of the invention and are included within the scope of the following claims.

What is claimed is:

1. A method for heating a portion of a subsea structure, comprising:
    pumping a fluid through a closed loop; and
    transferring heat from the fluid to a subsea structure,
    wherein the transferred heat is generated hydraulically by the pumping step;
    wherein the closed loop contains at least one pressure reducing device.

2. The method of claim 1, wherein the fluid is selected from the group consisting of seawater, water glycol, and mineral oil.

3. The method of claim 1, wherein the closed loop comprises tubing.

4. The method of claim 1, wherein the temperature of the fluid increases as the flowrate of the fluid increases at a constant pump output pressure.

5. The method of claim 1, wherein the temperature of the fluid increases as the pressure drop within the closed loop increases at a constant fluid flowrate.

6. The method of claim 1, wherein the at least one pressure reducing device is selected from the group consisting of fixed orifice, variable orifice, pressure reducing valve, and relief valve.

7. The method of claim 1, wherein the transferring step is executed in a heat exchanger pre-installed on the subsea structure.

8. The method of claim 1, wherein the pumping step is executed using a pump located on a remotely operated vehicle, and wherein power is provided to the pump from the remotely operated vehicle.

9. A method for heating a portion of a subsea structure, comprising:
    positioning heating coils around a location on a subsea structure;
    connecting a pump to the heating coils such that the connected pump and heating coils form a closed loop;
    pumping a fluid through the closed loop; and
    transferring heat from the fluid to the subsea structure through the heating coils,
    wherein the transferred heat is generated hydraulically by the pumping step.

10. The method of claim 9, wherein the closed loop comprises tubing.

11. The method of claim 9, wherein the heating coils are positioned using a crane.

12. The method of claim 9, wherein the heating coils are positioned using a remotely operated vehicle.

13. The method of claim 9, wherein the pump is connected using a remotely operated vehicle.

14. The method of claim 9, wherein the pump is located on a remotely operated vehicle, and wherein power is provided to the pump from the remotely operated vehicle.

15. The method of claim 9, wherein the heating coils are in fluid communication with a receptacle, wherein the pump is in fluid communication with a hot stab, and wherein the connecting step is executed by connecting the hot stab with the receptacle.

16. The method of claim 9, wherein at least one pressure reducing device is included in the closed loop.

17. The method of claim 16, wherein the at least one pressure reducing device is selected from the group consisting of fixed orifice, variable orifice, pressure reducing valve, and relief valve.

18. The method of claim 16, wherein the at least one pressure reducing device is in fluid communication with the pump prior to the connecting step.

19. A method for heating a portion of a subsea structure, comprising:
    pumping a first fluid through a first closed loop;
    pumping a second fluid through a second closed loop;
    transferring heat from the first fluid to the second fluid; and
    transferring heat from the second fluid to the subsea structure,
    wherein the heat transferred from the second fluid to the subsea structure is generated hydraulically by the pumping steps.

20. The method of claim 19, wherein the first fluid and the second fluid are the same type of fluid.

21. The method of claim 19, wherein the temperature of the first fluid increases as the flowrate of the first fluid increases at a constant pump output pressure.

22. The method of claim 19, wherein the temperature of the first fluid increases as the pressure drop within the first closed loop increases at a constant fluid flowrate.

23. The method of claim 22, wherein the pressure drop is created by friction in the first closed loop.

24. The method of claim 22, wherein the pressure drop is created by at least one pressure reducing device in the first closed loop.

25. The method of claim 24, wherein the at least one pressure reducing device is selected from the group consisting of fixed orifice, variable orifice, pressure reducing valve, and relief valve.

26. The method of claim 19, wherein the temperature of the second fluid increases as the flowrate of the second fluid increases at a constant pump output pressure.

27. The method of claim 19, wherein the temperature of the second fluid increases as the pressure drop within the second closed loop increases at a constant fluid flowrate.

28. The method of claim 27, wherein the pressure drop is created by friction in the second closed loop.

29. The method of claim 27, wherein the pressure drop is created by at least one pressure reducing device in the second closed loop.

30. The method of claim 29, wherein the at least one pressure reducing device is selected from the group consisting of fixed orifice, variable orifice, pressure reducing valve, and relief valve.

31. The method of claim 19, wherein the first pumping step is executed using a pump located on a remotely operated vehicle, and wherein power is provided to the pump from the remotely operated vehicle.

32. A method for heating a portion of a subsea structure, comprising:
pumping a fluid through a first loop using a first pump;
pumping the fluid through a second loop using a second pump;
transferring heat from the fluid to the subsea structure in the second loop;
wherein the transferred heat is generated hydraulically by the pumping steps;
wherein a loop contains at least one pressure reducing device.

33. The method of claim 32, wherein the first loop and the second loop are both in fluid communication with a common tank.

34. The method of claim 32, wherein the temperature of the fluid increases as the flowrate of the fluid in the first loop increases at a constant first pump output pressure.

35. The method of claim 32, wherein the temperature of the fluid increases as the pressure drop within the first loop increases at a constant fluid flowrate.

36. The method of claim 35, wherein the pressure drop is created by friction in the first loop.

37. The method of claim 35, wherein the pressure drop is created by at least one pressure reducing device in the first loop.

38. The method of claim 37, wherein the at least one pressure reducing device is selected from the group consisting of fixed orifice, variable orifice, pressure reducing valve, and relief valve.

39. The method of claim 32, wherein the temperature of the fluid increases as the flowrate of the fluid in the second loop increases at a constant second pump output pressure.

40. The method of claim 32, wherein the temperature of the fluid increases as the pressure drop within the second loop increases at a constant fluid flowrate.

41. The method of claim 40, wherein the pressure drop is created by friction in the second loop.

42. The method of claim 40, wherein the pressure drop is created by at least one pressure reducing device in the second loop.

43. The method of claim 42, wherein the at least one pressure reducing device is selected from the group consisting of fixed orifice, variable orifice, pressure reducing valve, and relief valve.

44. The method of claim 32, further comprising pumping the fluid through a third loop using a third pump.

45. The method of claim 44, wherein the first loop, second loop, and third loop are all in fluid communication with a common tank.

46. The method of claim 32, wherein the first pump is located on a remotely operated vehicle, and wherein power is provided to the first pump from the remotely operated vehicle.

47. An apparatus for heating a subsea structure, comprising:
a closed loop, the closed loop comprising:
a pump, and
at least one pressure reducing device, and
at least one length of tubing in fluid communication with the pump;
wherein pumping a fluid through the closed loop generates heat hydraulically and
increases the temperature of the fluid;
wherein heat is transferred from the fluid to the subsea structure.

48. The apparatus of claim 47, wherein heat is transferred from the fluid to the subsea structure through the at least one length of tubing.

49. The apparatus of claim 47, wherein the closed loop further comprises at least one heating coil in fluid communication with the at least one length of tubing, wherein heat is transferred from the fluid to the subsea structure through the at least one heating coil.

50. The apparatus of claim 47, wherein the at least one pressure reducing device is selected from the group consisting of fixed orifice, variable orifice, pressure reducing valve, and relief valve.

51. The apparatus of claim 47, wherein a first portion of the closed loop is installed at the subsea structure, and wherein a second portion of the closed loop is not installed at the subsea structure.

52. The apparatus of claim 51, wherein the second portion of the closed loop is located on a remotely operated vehicle.

53. The apparatus of claim 52, wherein the first portion and the second portion are connectable to complete the closed loop.

54. The apparatus of claim 53, wherein the first portion and the second portion are connected using a hot stab and a receptacle.

55. The apparatus of claim 47, wherein power is provided to the pump from a remotely operated vehicle.

56. An apparatus for heating a subsea structure, comprising:
a closed loop, the closed loop comprising:
a pump, and
at least one length of tubing in fluid communication with the pump;
wherein pumping a fluid through the closed loop generates heat hydraulically and
increases the temperature of the fluid;
wherein heat is transferred from the fluid to the subsea structure;
wherein a first portion of the closed loop is installed at the subsea structure;
wherein a second portion of the closed loop is not installed at the subsea structure.

57. The apparatus of claim 56, wherein the second portion of the closed loop is located on a remotely operated vehicle.

58. The apparatus of claim 57, wherein the first portion and the second portion are connectable to complete the closed loop.

59. The apparatus of claim 58, wherein the first portion and the second portion are connected using a hot stab and a receptacle.

60. The apparatus of claim 56, wherein power is provided to the pump from a remotely operated vehicle.

* * * * *